United States Patent
Waller et al.

(10) Patent No.: US 10,379,801 B1
(45) Date of Patent: Aug. 13, 2019

(54) PRINTER MODEL RECOMMENDATION MECHANISM

(71) Applicants: Marquis G. Waller, Beverly, OH (US); Joseph Wayne Stradling, Firestone, CO (US); Linda Sue Liebelt, Boulder, CO (US)

(72) Inventors: Marquis G. Waller, Beverly, OH (US); Joseph Wayne Stradling, Firestone, CO (US); Linda Sue Liebelt, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/906,552

(22) Filed: Feb. 27, 2018

(51) Int. Cl.
*G06F 3/12* (2006.01)

(52) U.S. Cl.
CPC .......... *G06F 3/1296* (2013.01); *G06F 3/1208* (2013.01); *G06F 3/1226* (2013.01); *G06F 3/1297* (2013.01)

(58) Field of Classification Search
None
See application file for complete search history.

(56) References Cited

U.S. PATENT DOCUMENTS

| | | | |
|---|---|---|---|
| 6,348,971 B2 * | 2/2002 | Owa | G06F 3/1204 358/1.1 |
| 8,576,430 B2 | 11/2013 | Balduccini | |
| 9,176,692 B2 | 11/2015 | Sato | |
| 9,216,591 B1 | 12/2015 | Rozier et al. | |
| 9,665,327 B1 | 5/2017 | Yokoohji et al. | |
| 2010/0073712 A1 * | 3/2010 | Cain | G06F 3/1204 358/1.15 |
| 2015/0160896 A1 * | 6/2015 | Roy | G06F 3/1204 358/1.15 |
| 2015/0378646 A1 | 12/2015 | James et al. | |

FOREIGN PATENT DOCUMENTS

| | | |
|---|---|---|
| CN | 105549925 | 5/2016 |
| JP | 2017084035 | 5/2015 |

\* cited by examiner

*Primary Examiner* — Henok Shiferaw
(74) *Attorney, Agent, or Firm* — Jaffrey Watson Mendonsa & Hamilton LLP (57) ABSTRACT

A system is described. The system includes a memory to store print performance recommendation logic, including a file handler, a printer acquisition module and a recommendation engine, and one or more processors to execute the file handler to receive print data, printer acquisition module to receive printer configuration information including performance data for each of a plurality of printers and the recommendation engine to generate a printer recommendation including one or more of the plurality of printers based on the print data and the printer configuration information.

14 Claims, 6 Drawing Sheets

PRINTER MODEL RECOMMENDATION MECHANISM

FIELD

This invention relates generally to the field of printing systems. More particularly, the invention relates to providing model recommendations for printing systems.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads).

High-performance production printers represent a significant monetary investment. Thus, potential customers want to ensure that a printer will perform well on specific sets of documents prior to finalizing a purchase. Currently, print samples and test data are submitted by potential customers to various printer vendors to determine a printer that best fits the customer's needs. However, sending samples back and forth to printer vendors is impracticable and costly, in both time and resources.

Accordingly, a mechanism to efficiently recommend a high-speed production printer that meets a customer's performance and quality demands based on historical data obtained with similar jobs on actual printers is desired.

SUMMARY

In one embodiment, a method is disclosed. The method includes receiving print data, receiving printer configuration information including performance data for each of a plurality of printers and generating a printer recommendation including one or more of the plurality of printers based on the print data and the printer configuration information.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A printer recommendation mechanism implemented to recommend a high-speed production printer model is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
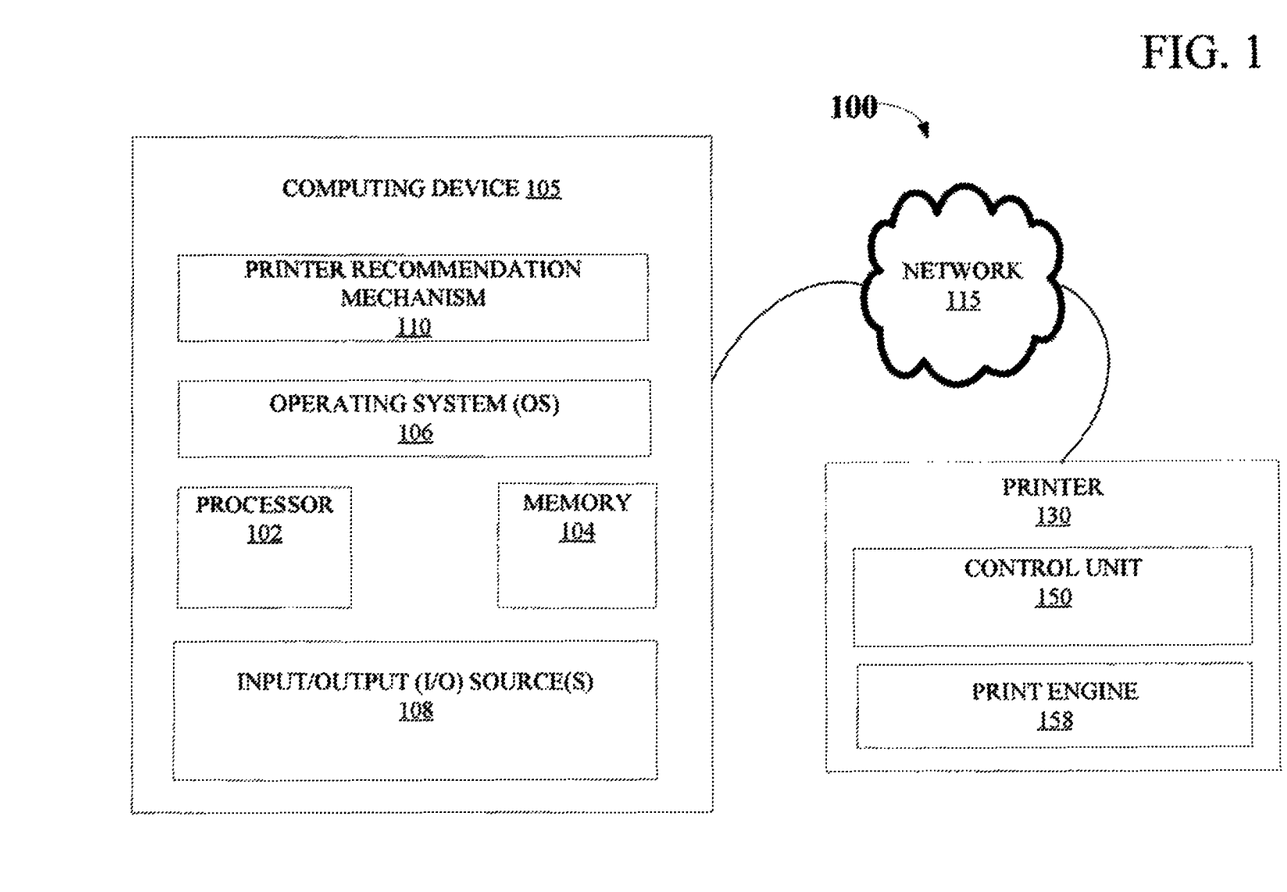
FIG. 1 illustrates one embodiment of a printing network.

FIG. 1 illustrates one embodiment of a printer network 100. Network 100 includes a printer 130 and a computing device 105. In one embodiment, printer 130 and computing device 105 communicate via a network 115. However, the network may have other configurations. For example, in some embodiments computing device 105 may be implemented in printer 130. According to one embodiment, computing device 105 serves as a host machine for hosting printer recommendation mechanism 110 that includes a combination of any number and type of components for facilitating print performance recommendation at computing devices, such as computing device 105.

Computing device 105 may include an operating system (OS) 106 serving as an interface between hardware and/or physical resources of the computer device 100 and a user. Computing device 105 may further include one or more processors 102, memory devices 104, network devices, drivers, or the like, as well as input/output (I/O) sources 108, such as touchscreens, touch panels, touch pads, virtual or regular keyboards, virtual or regular mice, etc.

According to one embodiment, printer recommendation mechanism 110 facilitates a customer recommendation for a high-speed production printer based on a data file (e.g., print data) provided by a customer and printer configuration information including data collected from a vast quantity of printers. In such an embodiment, recommendation mechanism 110 implements one or more supervised machine learning models to provide a recommendation by comparing components of the customer data file to printer configuration information, which may include previously processed data files and corresponding printers recommended for the data files. In a further embodiment, raw document information (e.g., objects, attributes, metadata, etc.) is extracted from print data and used as input to the model.

Printer 130 includes a control unit 150 and a print engine 158. According to one embodiment, control unit 150 processes and renders objects received in print job data 120 and provides sheet maps for printing to print engine 158. Control unit (e.g., DFE or digital front end) 150 is implemented to process image objects received at control unit 150 by a raster image processor (RIP) to convert an image described in a vector graphics format (e.g., shapes) into a raster image (e.g., pixels) that is to be stored as scan line data in a memory array (not shown) for output to print engine 158.

Figure 2:
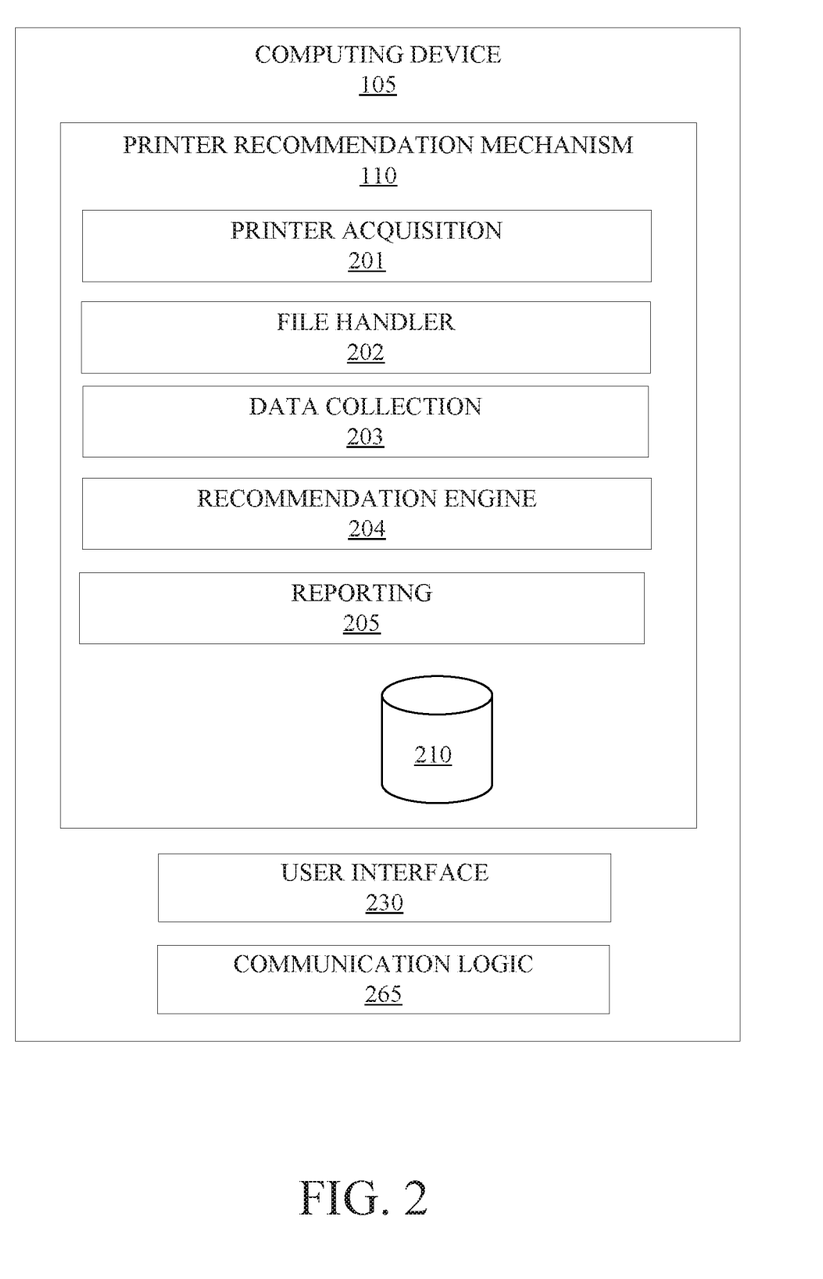
FIG. 2 illustrates one embodiment of a computing device employing a printer recommendation mechanism.

FIG. 2 illustrates a printer recommendation mechanism 110 employed at computing device 100. In one embodiment, printer recommendation mechanism 110 may include any number and type of components, such as: printer acquisition module 201, file handler logic 202, data collection module 203, recommendation engine 204 and reporting module 205.

Figure 3:
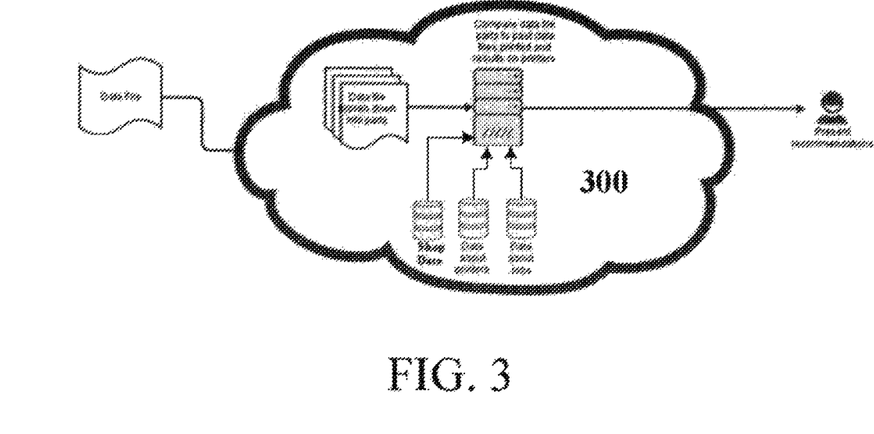
FIG. 3 illustrates another embodiment of a printer recommendation mechanism implemented in a cloud computing environment.

It is contemplated that any number and type of components 201-205 of printer recommendation mechanism 110 may not necessarily be implemented at a single computing device and may be allocated among or distributed between any number and type of computing devices. Thus, another computing device may also include printer recommendation mechanism 110 to perform functionality for one or more of components 201-206. Moreover, the components of printer recommendation mechanism 110 may be distributed among multiple computing devices 205 within a cloud computing environment. FIG. 3 illustrates an embodiment of a printer recommendation mechanism 110 implemented in a cloud computing environment 300.

According to one embodiment, printer acquisition module 201 receives printer configuration information. In one embodiment, printer configuration information includes data from printers accessible (e.g., from around the world) by printer recommendation mechanism 110. In such an embodiment, the printer configuration information may be received at cloud computing environment 300 from printers associated with various international printer vendors and/or customers. In a further embodiment, the printer data may include performance data, which may include: resource usage (e.g., ink usage, paper), print processing time, printer location, printer temperature, printer environment (e.g., temperature and humidity), printer settings for print jobs, frequency of errors and print quality.

In one embodiment, print quality may be measured based on user feedback regarding whether the received quality of print jobs have previously met expectations. Thus, ratings of expected quality are collected by printer acquisition module 201. In another embodiment, quality may be measured by receiving a scanned image from a printer and analyzing the image for quality factors (e.g., color coverage, bleeds, blemish, etc.) in comparison with a received data file. In a further embodiment, printer acquisition module 201 may receive information regarding printer capabilities, such as supported paper sizes and weights, finishing options. Once acquired, the printer data is saved to database 210.

File handler logic 202 receives print data (e.g., one or more print jobs and corresponding job tickets, if available) as input data. Upon receipt, file handler logic 202 extracts print data from a print job data file. In one embodiment, the extracted print data may include attributes, including images, dots per inch (dpi) of images, fonts, size of pages, plexing, media calls, etc. The extracted data may also include elements extracted from a print job's data structure (e.g., for Advanced Function Presentation (AFP) and Postscript (PS) jobs). Once data is extracted, file handler logic 202 saves the data corresponding to the file to database 210. Additionally, file handler logic 202 may also receive environmental data associated with an environment at which the received print data is to be printed.

According to one embodiment, data collection logic 203 may periodically collect the printer data from the various printers. Thus, accumulated printer data may be used to determine how a particular printer performs with data streams of different complexity and structure; and how the printer performs over time and in different conditions (e.g., temperature and humidity, hours running). Such accumulated printer data and information regarding the data structure of jobs the printer has been printing enables a comparative analysis of a newly received data file received to for printer model recommendation.

According to one embodiment, recommendation engine 204 provides a printer model recommendation based on a comparison of the extracted print data and the acquired printer configuration information from potentially a vast quantity of printers. In such an embodiment, recommendation engine 204 analyzes one or more attributes included in the print data to determine job requirements (e.g., paper types, color vs mono, etc.), as well as the actual data to be printed. Additionally, recommendation engine 204 analyzes the printer configuration information to determine the printer capabilities for each available printer. Recommendation engine 204 further continues the analysis by generating a model indicating how the print data would be printed on various printers based on the job requirements and the printer capabilities for each available printer.

In a further embodiment, recommendation engine 204 may consider the variability in the measurements provided by different print shops. For example, for two print shops having multiple model 123 printers, one print shop's ink usage numbers for their 123 printers may always be 30% higher than the ink usage numbers from the 123 printers at another shop. This type of variability can itself become a factor contributing to the recommendation (compared with another model of printer where the performance is more consistent across printers at different shops)

Figure 4:
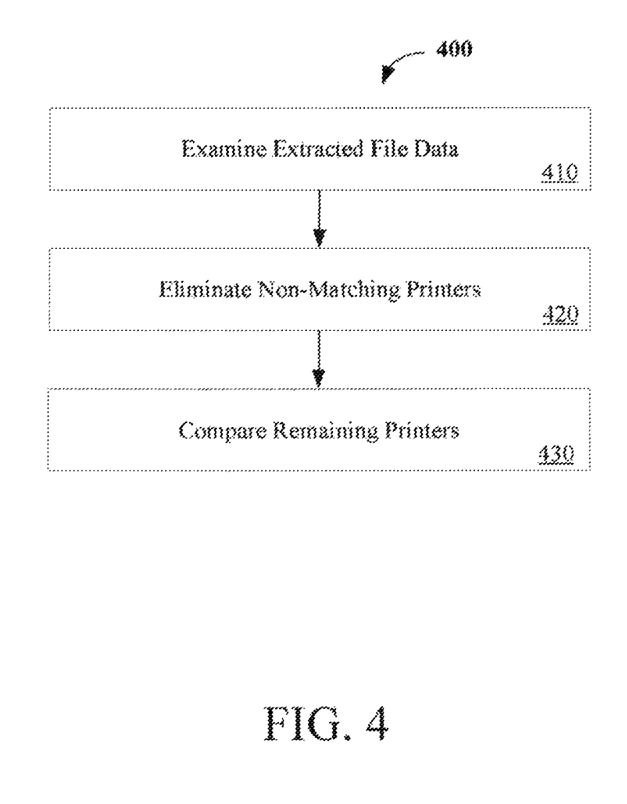
FIG. 4 is a flow diagram illustrating one embodiment of a recommendation process.

FIG. 4 is a flow diagram illustrating one embodiment of a process 400 to recommend one or more printer models. Process 400 may be performed by processing logic that may comprise hardware (e.g., circuitry, dedicated logic, programmable logic, etc.), software (such as instructions run on a processing device), or a combination thereof. In one embodiment, process 400 may be performed by recommendation engine 204. The process 400 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-3 are not discussed or repeated here.

At processing block 410, the extracted print data is examined for particular job requirements (e.g., all printers that do not match base requirements (media size and type (e.g., glossy B4 size), duplex, full bleed, etc.). At processing block 420, printers that do not match the base print job requirements are eliminated. At processing block 430, the remaining printers are compared.

In one embodiment, the comparison includes an analysis of the differences of the remaining printers. For instance, of two printers being compared, printer 1 may have an average quality score of 5 (on a scale of 1 to 5) (e.g., based on always matching expected quality and image scans never show blemishes or poor coverage), while printer 2 may have an average quality score of 2 (e.g., several misses on quality expected and never a scan of blemishes). Further, printer 1 may have a cost score of 1 (e.g., each page cost on average $10, compared to all other printers in this pool that is the worst), while printer 2 may have a cost score of 4 (e.g., each page cost on average of $2). This analysis may be presented to a user, who could consider the details of the scores above. Such an analysis may be performed for all measurements.

Reporting module 205 generates a presentation report that includes the cost scores for the various printer measurements that are being compared, as well as any additional information that is desirable to include in the presentation (e.g. printer configurations, performance requirements, and/or print jobs evaluated). Computing device 105 may also include communication logic 265 to facilitate communication with control unit 150 at printer 130 over network 115. In one embodiment, reporting module 206 may transmit the presentation report to printer 130 to generate a hard copy of the report.

Figure 5:
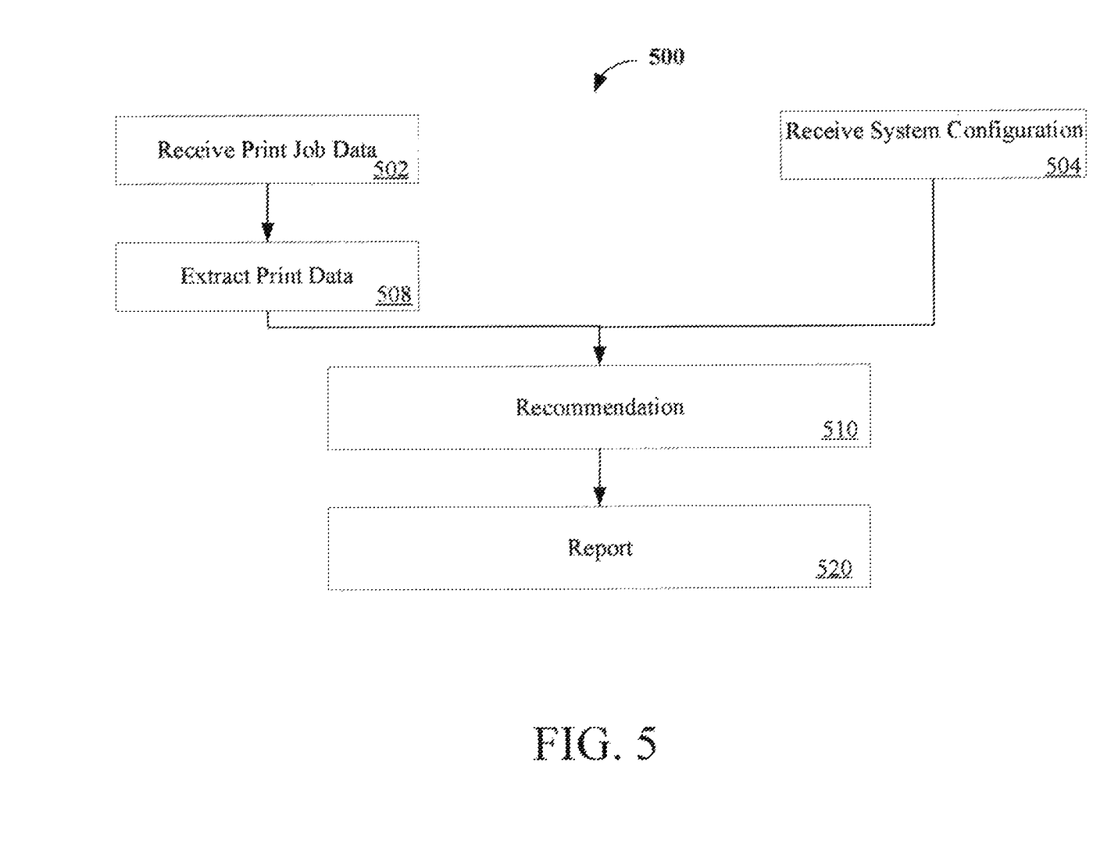
FIG. 5 is a flow diagram illustrating one embodiment of a process to perform a printer recommendation.

FIG. 5 is a flow diagram illustrating one embodiment of a process 500 to perform a printer recommendation. Process 500 may be performed by processing logic that may comprise hardware (e.g., circuitry, dedicated logic, programmable logic, etc.), software (such as instructions run on a processing device), or a combination thereof. In one embodiment, process 500 may be performed by printer recommendation mechanism 110. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

At processing blocks 502 and 504, print data and environmental data, and printer configuration information are received, respectively. At processing block 508, data is extracted from the print data prior to be provided for recommendation use. At processing block 510, a recommendation process, as disclosed above in FIG. 4, is performed. At processing block 520, a report including one or more printer comparisons and analysis may be generated and provided via a desired format.

Figure 6:
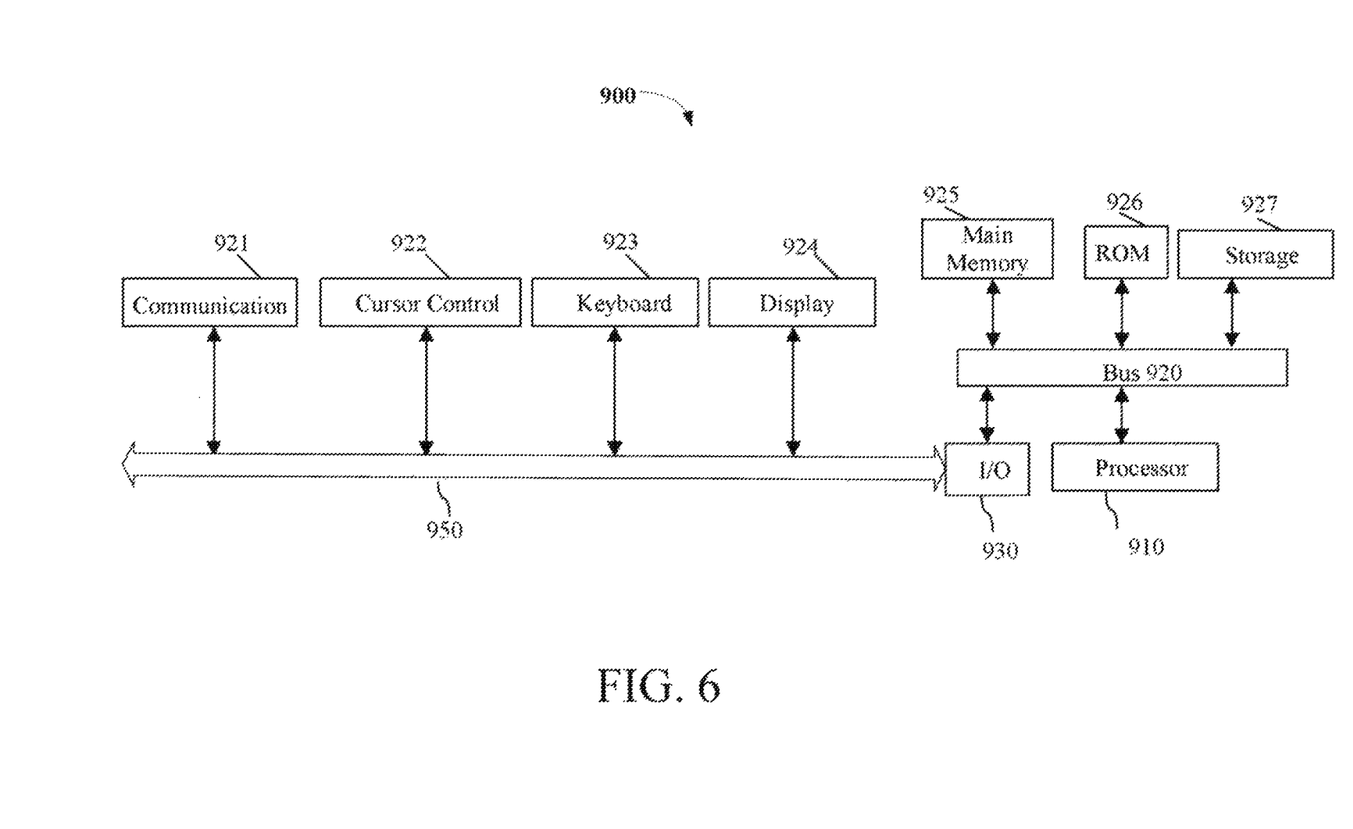
FIG. 6 illustrates a computing device suitable for implementing embodiments of the present disclosure.

FIG. 6 illustrates a computer system 900 on which computing device 105 and/or printer 130 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., keyboard (or an alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one non-transitory computer readable medium having instructions stored thereon, which when executed by one or more processors, cause the processors to:
   receive a print job data file;
   extract print data from the print job data file;
   receive printer configuration information including performance data for each of a plurality of printers; and
   generate a printer model recommendation including one or more of the plurality of printers based on the print data and the printer configuration information, comprising:

analyzing one or more attributes included in the print data to determine print job requirements;

analyzing the printer configuration information to determine printer capabilities for each of the plurality of printers;

generating a model based on the print job requirements and the printer capabilities indicating how the print data would be printed on each of the plurality of printers; and comparing a first set of the plurality of printers having capabilities that match the print job requirements by analyzing one or more differences between the performance data of each printer in the first set of the plurality printers; and display the printer capabilities and the one or more differences between the performance data of each printer in the first set of the plurality printers.

2. The computer readable medium of claim 1, wherein generating the printer model recommendation further comprises analyzing data to be printed.

3. The computer readable medium of claim 1, wherein the performance data comprises a print quality measurement.

4. The computer readable medium of claim 3, wherein the performance data further comprises one or more of resource usage, print processing time, printer location, printer temperature, printer environment, printer settings and frequency of errors.

5. The computer readable medium of claim 1, having instructions stored thereon, which when executed by the one or more processors, further cause the processors to generate a report including the printer model recommendation.

6. The computer readable medium of claim 5, having instructions stored thereon, which when executed by the one or more processors, further cause the processors to transmit the report to be printed.

7. The computer readable medium of claim 6, wherein generating the printer model recommendation further comprises:

eliminating a second set of the plurality of printers having capabilities that do not match the print job requirements.

8. A system comprising:

a memory to store printer recommendation logic, including:
  a file handler;
  a printer acquisition module; and
  a recommendation engine; and one or more processors to execute the file handler to receive a print job data file and extract print data from the print job data file, printer acquisition module to receive printer configuration information including performance data for each of a plurality of printers and the recommendation engine to generate a printer model recommendation including one or more of the plurality of printers based on the print data and the printer configuration information, comprising analyzing one or more attributes included in the print data to determine print job requirements, analyzing the printer configuration information to determine printer capabilities for each of the plurality of printers, generating a model based on the print job requirements and the printer capabilities indicating how the print data would be printed on each of the plurality of printers and comparing a first set of the plurality of printers having capabilities that match the print job requirements by analyzing one or more differences between the performance data of each printer in the first set of the plurality printers; and a display device to display the printer capabilities and the one or more differences between the performance data of each printer in the first set of the plurality printers.

9. The system of claim 8, wherein generating the printer model recommendation further comprises analyzing data to be printed.

10. The system of claim 9, wherein generating the printer model recommendation further comprises eliminating a second set of the plurality of printers having capabilities that do not match the print job requirements.

11. The system of claim 8, wherein the performance data comprises a print quality measurement.

12. The system of claim 11, wherein the performance data further comprises one or more of resource usage, print processing time, printer location, printer temperature, printer environment, printer settings and frequency of errors.

13. The system of claim 8, wherein the memory further stores a reporting module and the processor executes the reporting module to generate a report including the printer model recommendation.

14. The system of claim 13, further comprising a printer to print the report.

* * * * *